(12) United States Patent
Song et al.

(10) Patent No.: US 9,392,087 B2
(45) Date of Patent: Jul. 12, 2016

(54) MOBILE TERMINAL

(75) Inventors: Insu Song, Seoul (KR); Younghwan Moon, Gwangmyeong (KR); Youngmin Lee, Seoul (KR); Hyosung Park, Gwangmyeong (KR)

(73) Assignee: LG ELECTRONICS INC., Seoul (KR)

( * ) Notice: Subject to any disclaimer, the term of this patent is extended or adjusted under 35 U.S.C. 154(b) by 282 days.

(21) Appl. No.: 13/432,912

(22) Filed: Mar. 28, 2012

(65) Prior Publication Data

US 2012/0329526 A1    Dec. 27, 2012

(30) Foreign Application Priority Data

Jun. 27, 2011 (KR) .................. 10-2011-0062544

(51) Int. Cl.
*H04W 88/02* (2009.01)
*H04M 1/22* (2006.01)
*G06F 1/16* (2006.01)
*H04M 1/02* (2006.01)

(52) U.S. Cl.
CPC .............. *H04M 1/22* (2013.01); *G06F 1/1626* (2013.01); *G06F 1/1643* (2013.01); *H04M 1/0266* (2013.01)

(58) Field of Classification Search
CPC .................................................... H04W 88/02

USPC ........................... 455/566; 345/173, 169, 170
See application file for complete search history.

(56) References Cited

U.S. PATENT DOCUMENTS

| 2006/0066783 | A1 | 3/2006 | Sampsell |
| 2011/0007002 | A1 | 1/2011 | Tsai et al. |
| 2011/0050582 | A1* | 3/2011 | Ma et al. .................. 345/169 |

FOREIGN PATENT DOCUMENTS

| CN | 101431552 A | 5/2009 |
| CN | 101762906 A | 6/2010 |
| EP | 1227388 A1 | 7/2002 |
| EP | 2058727 A2 | 5/2009 |

\* cited by examiner

*Primary Examiner* — Christina Johnson
*Assistant Examiner* — Xue Liu
(74) *Attorney, Agent, or Firm* — Birch, Stewart, Kolasch & Birch, LLP (57) ABSTRACT

A mobile terminal is provided. The mobile terminal includes a terminal main body having a display module to display visual information, a window disposed above the display module and having a pattern layer to recognize a user's touch input, a key region formed on one surface of the window near one side thereof, and a light emitting module configured to illuminate the key region.

19 Claims, 4 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2011-0062544, filed on Jun. 27, 2011, the contents of which is incorporated by reference herein in its entirety.

BACKGROUND OF THE INVENTION

1. Field of the Invention

This specification relates to a mobile terminal having an electric device on a display module.

2. Description of Related Art

As it becomes multifunctional, a terminal can be allowed to capture still images or moving images, play music or video files, play games, receive broadcast and the like, so as to be implemented as an integrated multimedia player.

Such terminals may be divided into mobile/portable terminals and stationary terminals according to their mobility. The mobile terminals can be easily carried and have one or more of functions such as supporting voice and video telephony calls, inputting and/or outputting information, storing data and the like.

Various new attempts have been made for the terminals by hardware or software in order to implement and enhance such complicated functions.

BRIEF SUMMARY OF THE INVENTION

Therefore, an aspect of the detailed description is to provide a mobile terminal having a light emitting module with a more improved structure, capable of lighting up touch keys on a front surface of the terminal.

To achieve these and other advantages and in accordance with the purpose of this specification, as embodied and broadly described herein, there is provided a mobile terminal a terminal main body having a display module to display visual information, a window laminated on the display module and having a pattern layer to recognize a user's touch input, a key region formed near one side of the window, and a light emitting module configured to light the key region up, wherein the key region is laminated on the display module.

According to one aspect of the present disclosure, the light emitting module may include a light guiding path portion configured to form a path of light reflected on an inner circumferential surface thereof, and a light emitting portion configured to emit light to the light guiding path portion.

According to one aspect of the present disclosure, the display module may include a liquid crystal layer and a driver Integrated Circuit (IC) configured to control signals with respect to the liquid crystal layer.

According to one aspect of the present disclosure, the driver IC, the light guiding path portion and the key region may be perpendicularly laminated in a sequential manner.

According to one aspect of the present disclosure, at least part of the light guiding path portion may be located between the pattern layer and the driver IC.

According to one aspect of the present disclosure, the light guiding path portion may include a buffering member configured to buffer impact applied to the driver IC.

According to one aspect of the present disclosure, the driver IC, the light guiding path portion and the key region perpendicularly laminated may integrally form a perpendicular surface, and a case defining an appearance of the main body may be disposed near the perpendicular surface.

According to one aspect of the present disclosure, the light emitting portion may be disposed on an extending surface of the display module at an adjacent position to the display module.

According to one aspect of the present disclosure, the mobile terminal may further include a circuit board laminated on one surface facing the window of the display module, the circuit board having a ground, and the case may include a radiator connected to the circuit board to be fed or grounded, such that the case can operate a part of an antenna for radiating a wireless signal of a specific frequency band.

In accordance with another exemplary embodiment, there is provided a mobile terminal including a terminal body having a circuit board to process wireless signals, a terminal case defining an appearance of the terminal and serving as a part of a radiator to transmit and receive the wireless signals, a display module laminated on the circuit board and configured to output visual information, a window mounted on a front surface of the terminal body to be sensitive to a touch input, a key region formed on one surface of the window to be sensitive to a touch input, and a light emitting module having at least part thereof disposed between the key region and the display module to reduce a spaced gap between one side of the display module and the terminal case.

Accordingly, the mobile terminal in accordance with at least one exemplary embodiment can be configured to minimize a spaced gap between the display module and the terminal case, so as to implement a wider display region in a terminal having the same area.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of a mobile terminal according to the exemplary embodiments, with reference to the accompanying drawings. For the sake of brief description with reference to the drawings, the same or equivalent components will be provided with the same reference numbers, and description thereof will not be repeated. The expression in the singular form in this specification will cover the expression in the plural form unless otherwise indicated obviously from the context.

Figure 1:
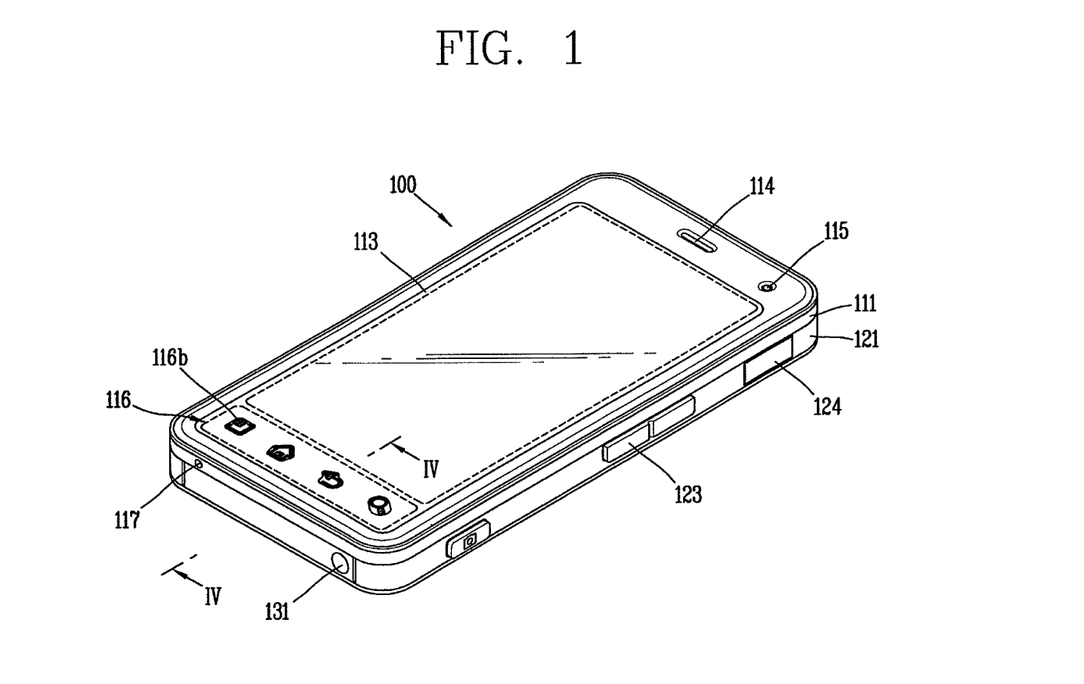
FIG. 1 is a front perspective view of a mobile terminal in accordance with one exemplary embodiment.

FIG. 1 is a front perspective view showing one exemplary embodiment of a mobile terminal 100 according to the present disclosure.

A case (casing, housing, cover, etc.) forming an outer appearance of the first body 110 may be formed from a front case 111 and a rear case 121. A space formed by the front case 111 and the rear case 121 may accommodate various components therein. At least one intermediate case may further be disposed between the front case 111 and the rear case 121. Such cases may be formed by injection-molded synthetic resin, or may be formed using a metallic material such as stainless steel (STS) or titanium (Ti).

The front case 111 is shown having a display unit 113, a first audio output module 114, a first image input unit 115, a first manipulation unit 116, an audio input unit 117 and the like.

The display unit 113 may include a display module 141 (see FIG. 3), such as a Liquid Crystal Display (LCD) module, an Organic Light-Emitting Diode (OLED) module and the like to display visible information. The display unit 113 may be implemented as a touch screen so as to allow inputting of information by a user's touch.

The first audio output module 114 may include a receiver, a speaker or the like.

The first image input unit 115 may be a camera module for capturing images or video of the user and the like.

The first manipulation unit 116 may be manipulated to allow inputting of commands for controlling operations of the mobile terminal 100. The first manipulation unit 116 may be a key region formed to be sensitive to a touch input by a user on a window.

The audio input unit 117 may be implemented, for example, as a type of microphone for receiving voice or other sounds input by the user.

The rear case 121 mounted to the rear surface of the mobile terminal 100 may be provided with a second manipulation unit 123, an interface 124, a power supply unit 125 and the like.

The second manipulation unit 123 may be installed at a side surface of the rear case 121. The first and manipulation units 116 and 123 may be referred to as a manipulating portion. Such manipulating portion can employ any tactile manner that a user can touch or tap for manipulation. For instance, the manipulating portion may be implemented as a dome switch, a touchpad or the like by which a user can input commands or information in a pushing or touching manner. Alternatively, the manipulating portion may be implemented as a wheel or a jog which rotates keys or a joystick.

From the functional perspective, the first manipulation unit 116 is configured to input commands such as START, END or the like, and the second manipulation unit 123 can be worked as a hot key which performs a specific function, such as activating of the first image input unit 115, as well as a scroll function. Upon employing at least the first and second manipulation units 116 and 123, inputting of telephone numbers or text messages may be executed using a touch screen disposed on the display unit 113.

The interface 124 may serve as a path for allowing data exchange between the mobile terminal and an external device. For example, the interface unit 126 may be at least one of wired/wireless earphone ports, ports for short-range communication (e.g., IrDA, Bluetooth, WLAN, etc.), power supply terminals for power supply to the mobile terminal and the like. The interface unit 124 may be a card socket for coupling to external cards, such as a Subscriber Identity Module (SIM), a User Identity Module (UIM), a memory card for storage of information and the like.

A power supply unit 125 may be provided at the rear case 121 to supply power to at least one component of the mobile terminal 100. The power supply unit 125, for example, may include a rechargeable battery for power supply.

Figure 2:
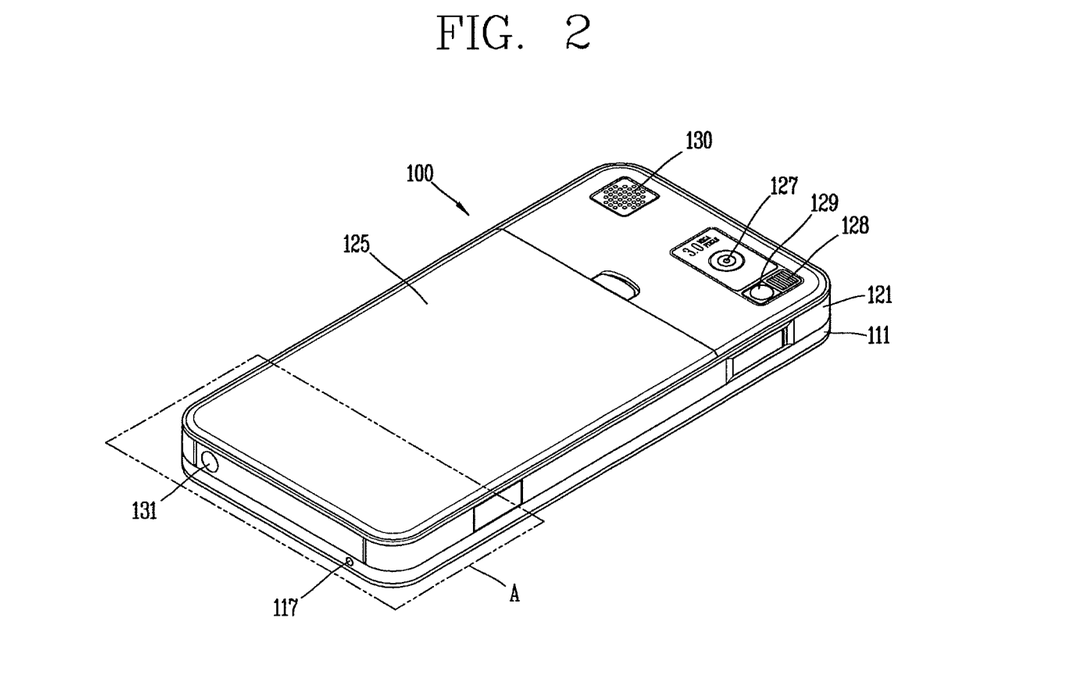
FIG. 2 is a rear perspective view of the mobile terminal shown in FIG. 1.

FIG. 2 is a rear perspective view of the mobile terminal 100 shown in FIG. 1.

As shown in FIG. 2, the rear case 121 is shown having a second image input unit 127, a second audio output module 130, a broadcast signal receiving antenna 131 and the like.

The second image input unit 127 faces a direction which is opposite to a direction faced by the first image input unit 115 (see FIG. 1), and may have different pixels from those of the first image input unit 115.

For example, the first image input unit 115 may operate with relatively lower pixels (lower resolution). Thus, the first image input unit 115 may be useful when a user can capture his face and send it to another party during a video call or the like. On the other hand, the second image input unit 127 may operate with relatively higher pixels (higher resolution) such that it can be useful for a user to obtain higher quality pictures for later use.

A flash 128 and a mirror 129 may additionally be disposed adjacent to the second image input unit 127. The flash 129 operates in conjunction with the second image input unit 128 when taking a picture using the second image input unit 127. The mirror 129 can cooperate with the second image input unit 127 to allow a user to photograph himself in a self-portrait mode.

The second audio output module 130 can cooperate with the first audio output module 114 (see FIG. 1) to provide stereo output. Also, the audio output module 130 may be configured to operate as a speakerphone.

A broadcast signal receiving antenna 131 may be disposed at one side of the rear case 121 in addition to an antenna for communications. The antenna 131 may be drawn out of the rear case 121.

As described above, it has been described that the first manipulation unit 116 or the like is disposed at the front case 111 and the second manipulation unit 123 or the like is disposed at the rear case 121; however, the present disclosure may not be limited to the configuration. For example, the second manipulation unit 123 may be disposed at the front case 111 in the vicinity of the first manipulation unit 116. In addition, without the second image input unit 127, the first image input unit 115 can be implemented to be rotatable so as to rotate up to a direction which the second image input unit 127 faces.

Figure 3:
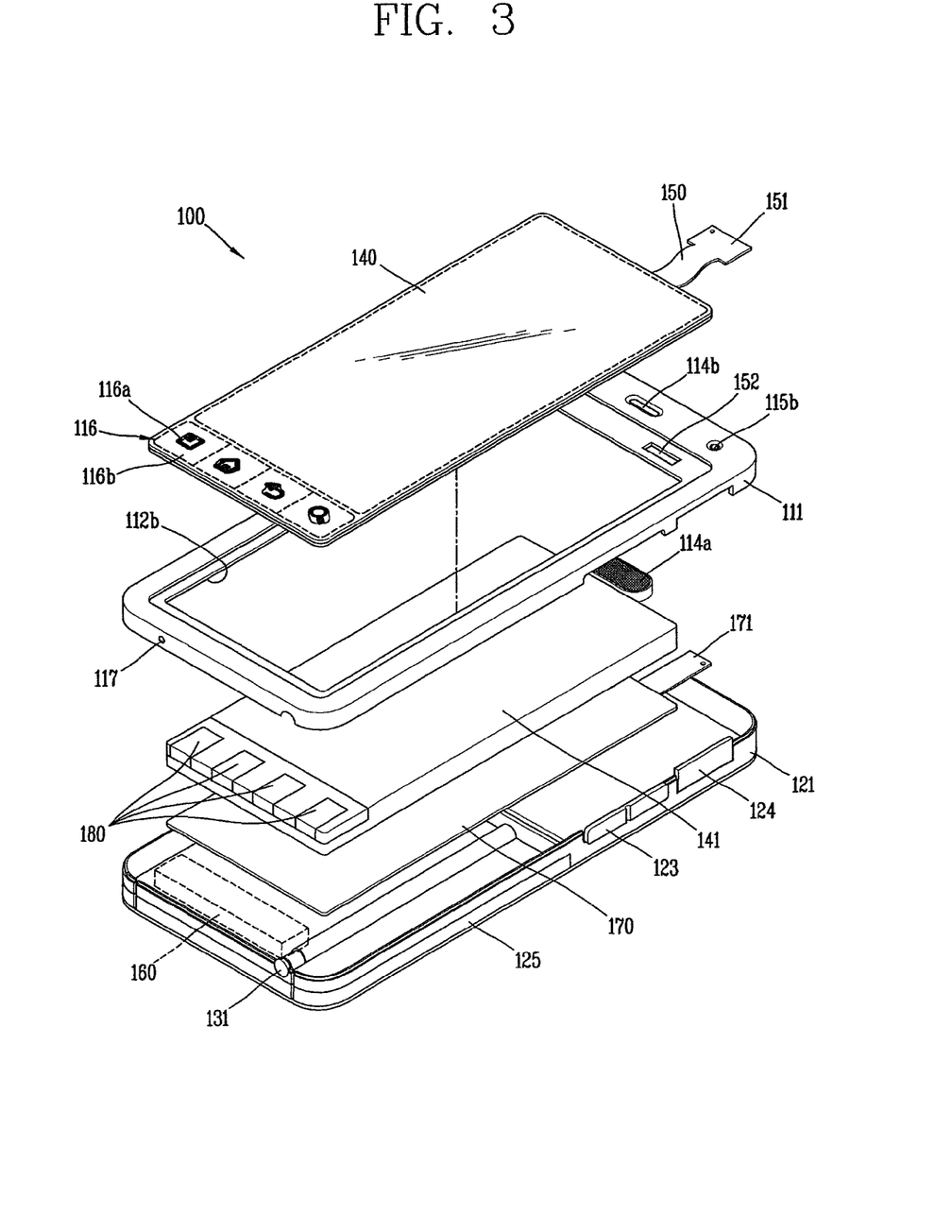
FIG. 3 is a disassembled perspective view of the mobile terminal shown in FIG. 1.

FIG. 3 is a disassembled perspective view of the mobile terminal 100 shown in FIG. 1.

As shown in FIG. 3, a window 140 may be coupled to obscure one surface of the front case 111. The window 140 may obscure a display module 141 such that visible information output on the display module 141 can be recognized from the exterior. The display module 141 and the window 140 may configure the display unit 113 (see FIG. 1).

The window 140 may be allowed for recognition of user's touch input and for inputting of information (commends, signals, etc.).

The window 140 may have an area corresponding to that of the display module 141. The window 140 may be formed of a transparent material. The window 140 may have a completely opaque area or an area with extremely low light transmittance. For example, edges of the window 140 may be surface-processed such that light cannot be transmitted therethrough.

The front case 111 may be provided with a manipulation pad corresponding to the first manipulation unit 116 (see FIG. 1). The manipulation pad is a target touched or pressed by a user. The manipulation pad may be formed as a manipulation area at a portion of the window 140.

The front case 111 may include a sound hole 114b, a window hole 112b and an image window 115b.

The sound hole 114b may be formed to correspond to the audio output module 114, such that sounds of the mobile terminal, for example, ringtone, music and the like, can come therethrough. The window hole 112b may be formed to correspond to the display unit 113. The transparent image window 115b may be formed to correspond to the first image input unit 115 (see FIG. 1).

The rear case 121 is shown having a circuit board 170, a display module 141, a speaker module 114a, a camera module, a switch and the like.

The circuit board 170 may be implemented as one example of a controller for running various functions of the mobile terminal 100. The circuit board 170 may detect an electrical change, which is generated due to a user's touch on the window 140, for example, a change in capacitance or the quantity of electric charges.

An electrode may be installed within the window 140. The electrode may be formed as a conductive pattern. The electrode may be charged with electric charges. When an electric conductor moves within a close distance, the quantity of electric charges being charged can change accordingly. When an electric conductor, for example, a user's finger touches the window, the quantity of electric charges being charged in the electrode may change, which is eventually the same as the change in capacitance between the finger and the electrode.

The electrode of the window 140 may be electrically connected to the controller, for example, the circuit board 170 for detecting changes in the quantity of electric charges. For the electrical connection, a flexible printed circuit board 150 may be connected to the circuit board 170 via a hole 152 (see FIG. 3). As the change in the quantity of electric charges is detected, the circuit board 170 may change a state of at least one function relating to the mobile terminal 100.

The flexible printed circuit board 150 may extend from one end of the window 140. A connecting portion 151 may be formed at one end of the flexible printed circuit board 150 to be connected to the electrode. The other end of the flexible printed circuit board 150 may be connected to the circuit board 170 via a connector. The connecting portion 151 may be formed of a metal so as to maintain a preset stiffness and elasticity.

Figure 4:
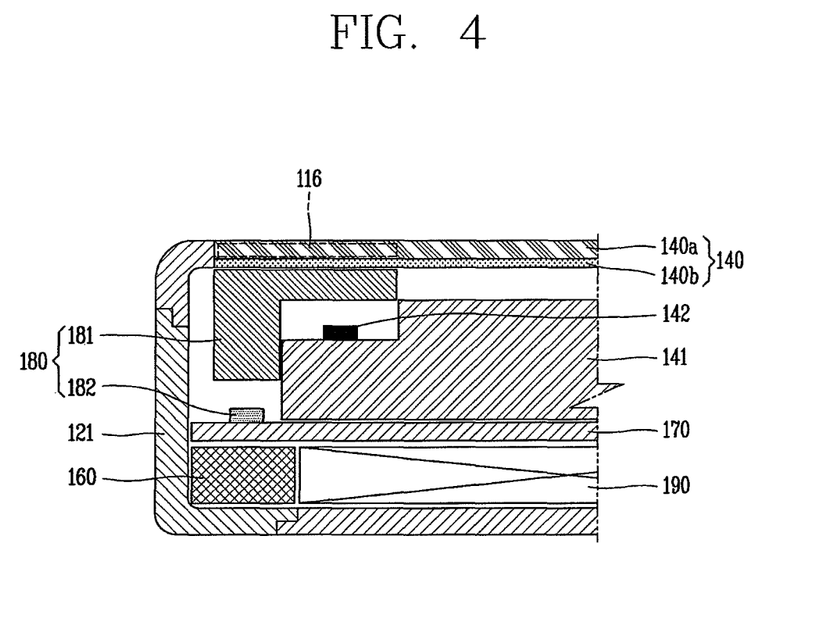
FIG. 4 is a sectional view taken along the line IV-IV of FIG. 1.
Figure 5:
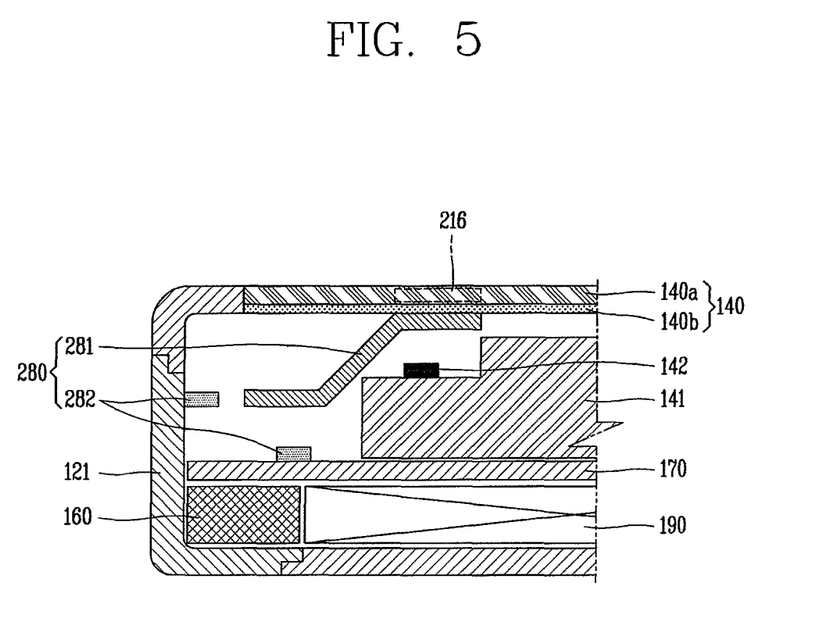
FIGS. 5 and 6 are overviews showing variations of FIG. 4.
Figure 6:
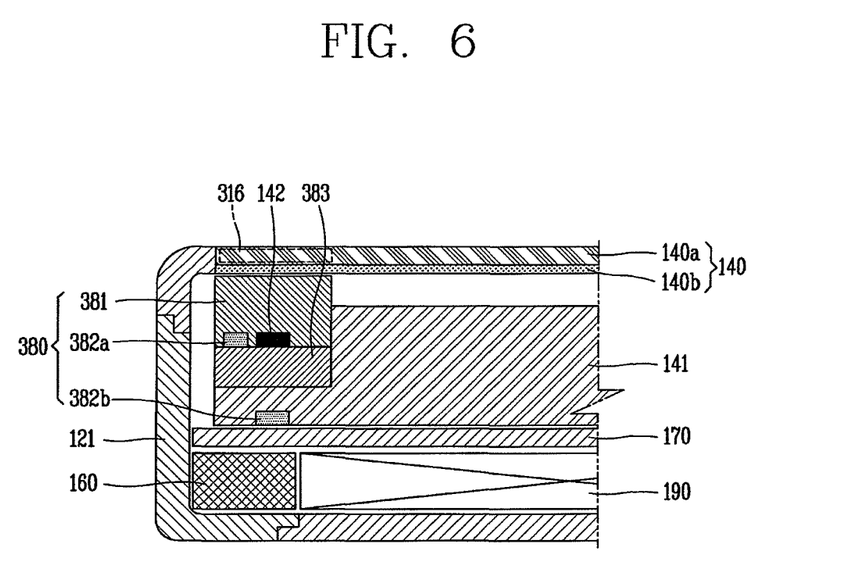

FIG. 4 shows a sectional view taken along the line IV-IV of FIG. 1, and FIGS. 5 and 6 are overviews showing variations of FIG. 4.

As shown in FIGS. 4 to 6, a mobile terminal according to one exemplary embodiment may include a display module 141, a window 140 disposed on the display module 141, a key region 116, 216, 316 located near a side of the window 140, and a light emitting module 180, 280, 380 to emit light to the key region 116, 216, 316. The display module 141 may be mounted onto the circuit board 170, and an antenna 160 and a battery 190 may be mounted below the circuit board 170. Alternatively, the circuit board and the battery may be formed on the same plane.

The window 140 may include a transparent window 140a having a preset stiffness, and a pattern layer 140b disposed on one surface of the window 140a to detect a touch input on the window 140a. That is, the pattern layer 140b may be formed on the window 140a. The pattern layer 140b, as aforementioned, may be a pattern formed of a conductive electrode.

Referring to FIG. 1 and FIGS. 4 to 6, the key region 116, 216, and 316 may be located near a lower end of the terminal. Accordingly, the mobile terminal can maximize a display region and enhance spatial utilization.

The key region 116, 216, 316 is generally formed to be lit (illuminated) responsive to a touch input so as to increase visibility and become more attractive. The key region 116, 216, 316 may include key marks 116b imaged to be associated with each function of the terminal. The key marks 116b may have images, such as square, home, arrow indicating the back, magnifying glass and the like, so as to remind of a menu function, a "home" function, a rewind function, a search function and the like. Accordingly, when a user views the key marks 116b, the user can intuitively recognize that a desired function of the terminal can be activated upon pressing or touching the corresponding key. That is, the key region 116, 216, 316 may include the key marks 116b having different patterns from one another, accordingly, preset functions of the terminal can be activated when the key marks 116b are touched.

To light up a key region, a light emitting module is generally disposed near a lower surface of the key region. The light emitting module includes a light guiding path portion, and a light emitting portion, which have preset sizes, respectively. Thus, in order for the light emitting module to be located between a display module and a terminal case, the display module and the terminal case should be spaced apart from each other. Hence, the key region may not be disposed near an end of the terminal case.

Hence, referring to FIGS. 4 to 6, at least part of the light guiding path portion 181, 281, 381 may be located between the display panel 141 and the key region 116, 216, 316. Accordingly, the spaced gap between the display module 141 and the rear case 121 can be narrowed by a length that the light guiding path portion 181, 281, 381 is inserted between the display panel 141 and the key region 116, 216, 316. The light guiding path portion 181, 281, 381 may be implemented as a light guide film or light guide plate, so as to serve as a path of light emitted from the light emitting portion 182, 282, 382. Also, the light emitting portion 182, 282, 382 may be implemented as a Light Emitting Diode (LED) exhibiting high efficiency as compared to power consumption.

The key region 116, 216, 316 may be divided to correspond to the key marks 116b. When the plurality of key marks 116b are touched, a user can easily recognize each key mark 116b by virtue of light emitted from the light emitting portion 182, 282, 382 disposed below the key region 116, 216, 316. Each key region 116, 216, 316 may be illuminated by the light emitting portion 182, 282, 382 disposed therebelow, and driven in an independent manner. Hence, the user can manipulate the terminal more accurately and also light with different brightness and color may be emitted through the divided key region, thereby providing the user with convenience in use and unique attractiveness.

The display module 141 may include a liquid crystal layer, and a driver Integrated Circuit (IC) 142 for controlling signals with respect to the liquid crystal layer. As aforementioned, when the at least part of the light guiding path portion 181, 281, 381 is disposed between the display panel 141 and the key region 116, 216, 316, upon pressure or impact being applied to the light guiding path portion 181, 281, 381 via the window 140a, the driver IC 142 sensitive to impact may be damaged. Hence, the light guiding path portion 181, 281, 381 may include a buffering member for buffering the impact applied to the driver IC 142. A buffer made of rubber or resin with elasticity may be used as one example of the buffering member. Alternatively, the light guiding path portion 181, 281, and 381 itself may be formed to have the buffering property, or the buffering member may be coupled to one surface of the light guiding path portion 181, 281, 381 contacting the driver IC 142.

As shown in FIG. 4, the key region 116 may be formed above the display module 141. More particularly, the key region 116 may be formed on a surface of the display module 141 where the driver IC 142 is disposed. That is, the driver IC 142, the light guiding path portion 181 and the key region 116 are perpendicularly laminated in a sequential manner. Accordingly, a display region can be maximized and the spaced gap between the display module 141 and the rear case 121 can be reduced, thereby enhancing spaced utilization.

FIGS. 5 and 6 show variations of the light emitting module shown in FIG. 4. As shown in FIG. 5, the light guiding path portion 281 may be disposed between the pattern layer 140*b* and the driver IC 142, and the light guiding path portion 281 may be disposed along a line extending from a side of the display module 141. As the light emitting portion 282 emits light, the light guiding path portion 281 guides the light emitted from the light emitting portion 282 to at least part of the key region 216 laminated on the pattern layer 140*b*. Although the spaced gap between the display module 141 and the rear case 121 in the example shown in FIG. 5 is wider than that in FIG. 4, the flexible printed circuit board to connect the display module 141 and the circuit board 170 can be disposed within the gap, thereby enhancing the spatial utilization.

As shown in FIG. 6, the light emitting module 380 may utilize a part of a backlight unit 382*a* of the display module 141 as a light emitting portion. Here, preferably, a transparent member 383 may be disposed between the driver IC 142 and the backlight unit 382*b*, and the driver IC 142 may be formed on one surface of the transparent member 383. Accordingly, when the backlight unit 382*a* is used as the light emitting portion, the light guiding path portion 381 disposed between the transparent member 383 and the pattern layer 140*b* can define a light path.

As such, it can be seen in the example shown in FIG. 6 that the spaced gap between the display module 141 and the rear case 121 is narrower than that in FIG. 4.

The light emitting portion may alternatively be disposed on the same plane with the driver IC 142. In this structure, the same spaced gap between the display module 141 and the rear case 121 can be achieved without the transparent member.

Figure 7:
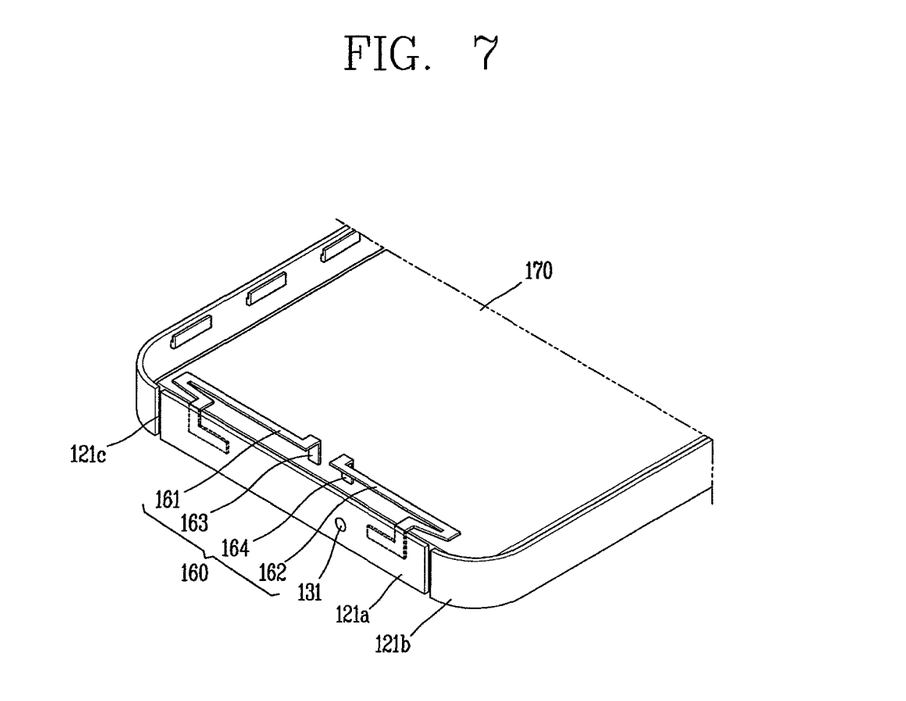
FIG. 7 is a perspective view showing a part A of FIG. 2 without a battery cover and a battery.

FIG. 7 is a perspective view showing a part A of FIG. 2 without a battery cover and a battery. Especially, according to the exemplary embodiments of the present disclosure, an antenna 160 may preferably be disposed at a rear surface of the display module 141.

In general, when an antenna is disposed near a space where electrical devices, such as the display module 141, are mounted, it is prone to reducing radiation efficiency of the antenna. Thus, as shown in FIG. 7, when the terminal case is used as a part of a radiator, it may be possible to achieve satisfactory antenna performance with maximizing spatial efficiency of the terminal.

Referring to FIG. 7, a mobile terminal according to one exemplary embodiment may include an antenna located near one end of the terminal. The antenna may use a part of a case formed along a side surface of a main body of the terminal as a part of a conductive member. That is, an antenna according to one exemplary embodiment may be implemented as a closed loop antenna formed by a first member 121*a*, a feeding connection portion 164, a ground connection portion 163, and a circuit board 170. A first member 121*a* and a second member 121*b* may be radiators formed to transmit and receive wireless signals. The radiators may configure the terminal case or be provided as conductive members within the case.

The first member 121*a* and the second member 121*b*, which occupy a part of a cover defining an appearance of the terminal, may be disposed to obscure side surfaces of the circuit board 170. The first member 121*a* may be formed of a conductive metal, and operate as a main radiator of the loop antenna. At least part of the second member 121*b* may be formed of a conductive metal so as to form another conductive loop.

The first member 121*a* and the feeding connection portion 164 may be connected to each other via a first pattern 162, and the first member 121*a* and the ground connection portion 163 may be connected to each other via a second pattern 161. The patterns may form a carrier. The first member 121*a*, the second member 121*b* and the patterns 161 and 162 may be combined to form a conductive loop operating at one band of a communication band (800~1000 MHz) for Code Division Multiple Access (CDMA) and Global System for Mobile communication (GSM), a communication band (1700~1900 MHz) for Personal Communication System (PCS) and Digital Cellular System (DCS), or a communication band (2.4 GHz) for Wideband CDMA (W-CDMA). The conductive loop may be formed to satisfy half wavelength of a specific frequency.

The first pattern 162 and the second pattern 161 may have a conductor in a twisted form. The conductor may be fabricated in various forms according to resonance or frequency characteristic. A current is fed to the conductor via the feeding connection portion 164, and the current fed may be shorted by the ground connection portion 163.

Slits 121*c* may be formed between the first member 121*a* and the second member 121*b* to space them from each other. The first member 121*a* may form a conductive loop together with the feeding connection portion 164, the ground connection portion 163 and the patterns 161 and 162. That is, the antenna 160 can operate as the loop antenna by blocking a current flowing on the second member 121*b* or reducing a coupling effect even if the second member 121*b* includes the conductive metal.

The feeding connection portion 164 may feed the first member 121*a* by an electrical connection (or Electro-magnetic (EM) feeding method), and the ground connection portion 163 may be connected to the first member 121*a* to be grounded so as to electrically short the first member 121*a*, thereby implementing an impedance matching with respect to a resonant frequency of the antenna.

The feeding connection portion 164 may electrically connect the first member 121*a* and a feeder (not shown) to each other. For the electrical connection, the feeding connection portion 164 may include a feeding plate, a feeding clip and a feeding line. Here, the feeding plate, the feeding clip and the feeding line may be electrically connected to one another so as to deliver a current fed by the feeder to the conductor of the radiator. Here, the feeding line may include a microstrip printed on a substrate.

The ground connection portion 163 may electrically connect an electrical ground to one end of the first member 121*a* or the second member 121*b*, thereby grounding the first member 121*a* or the second member 121*b*. The electrical ground may be a ground on the circuit board 170. Here, the ground connection portion 163 may have at least two paths having different lengths from each other, and switches corresponding to the respective paths. Also, the paths may selectively connect the electrical ground to the radiator (as one example, the first member) via the corresponding switches such that the paths have different lengths. Here, the path is an electrical path for connection between the ground and the radiator, and may be formed by including a ground plate, a ground clip and a ground line. Also, the ground line may have a different length to vary the length of the path.

The foregoing embodiments and advantages of the mobile terminal are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a terminal main body having a display module to display visual information;
a window disposed above the display module and having a pattern layer to recognize a user's touch input, the window having an upper surface defining an exterior of the mobile terminal;
a key region formed on one surface of the window near one side thereof; and
a light emitting module configured to illuminate the key region,
wherein the key region is disposed above the display module so as to at least partially overlap the display module in a direction normal to the upper surface of the window,
wherein at least a portion of the light emitting module is disposed between the key region and the display module to reduce a spaced gap between one side of the display module and the terminal case,
wherein the light emitting module includes:
a light guiding path portion configured to form a path of light reflected on an inner circumferential surface thereof and to guide the light towards the key region; and
a light emitting portion configured to emit light to the light guiding path portion, and
wherein at least a part of the light guiding path portion is located between the display module and the key region so as to overlap the display module in the direction normal to the upper surface of the window.

2. The mobile terminal of claim 1, wherein the display module comprises a liquid crystal layer and a driver Integrated Circuit (IC) configured to control signals with respect to the liquid crystal layer.

3. The mobile terminal of claim 2, wherein the driver IC, the light guiding path portion and the key region are stacked in a sequential manner.

4. The mobile terminal of claim 3, wherein at least part of the light guiding path portion is located between the pattern layer and the driver IC.

5. The mobile terminal of claim 4, wherein the light guiding path portion includes a buffering member configured to buffer impact applied to the driver IC.

6. The mobile terminal of claim 3, wherein the driver IC, the light guiding path portion and the key region are integrally stacked to form a perpendicular surface, and
wherein a case defining an appearance of the terminal main body is disposed near the perpendicular surface.

7. The mobile terminal of claim 2, wherein the light guiding path portion is a backlight provided on one surface of the liquid crystal layer.

8. The mobile terminal of claim 7, wherein a transparent member is disposed between the driver IC and the backlight, and
wherein the driver IC is formed on one surface of the transparent member.

9. The mobile terminal of claim 1, wherein the display module includes an extending portion that is thinner than the remainder of the display module, and
wherein the light emitting portion is disposed on the extending portion of the display module.

10. The mobile terminal of claim 1, wherein key marks are formed within the key region, the key marks having different patterns associated with functions of the mobile terminal.

11. The mobile terminal of claim 10, wherein the key region is divided at each of the key marks, and
wherein a light guiding path portion is disposed below each of the divided key regions to guide light toward the corresponding key mark.

12. The mobile terminal of claim 1, wherein the light emitting portion comprises at least one Light Emitting Diode (LED).

13. The mobile terminal of claim 6, further comprising a circuit board facing the window, the circuit board having a ground, and
wherein the case comprises a radiator connected to the circuit board to be fed or grounded, such that the case operates as a part of an antenna for radiating a wireless signal of a specific frequency band.

14. A mobile terminal comprising:
a terminal body having a circuit board to process wireless signals;
a terminal case defining an appearance of the mobile terminal and serving as a part of a radiator to transmit and receive the wireless signals;
a display module provided on the circuit board and configured to output visual information;
a window mounted on a front surface of the terminal body to be sensitive to a touch input, the window having an upper surface defining an exterior of the mobile terminal;
a key region formed on one surface of the window to be sensitive to a touch input, the key region at least partially overlapping the display module in a direction normal to the upper surface of the window; and
a light emitting module having at least part thereof disposed between the key region and the display module to reduce a spaced gap between one side of the display module and the terminal case,
wherein the light emitting module includes:
a light guiding path portion configured to form a path of light reflected on an inner circumferential surface thereof and to guide the light towards the key region; and
a light emitting portion configured to emit light to the light guiding path portion, and wherein at least a part of the light guiding path portion is located between the display module and the key region so as to overlap the display module in the direction normal to the upper surface of the window.

15. The mobile terminal of claim 14, wherein the display module comprises a liquid crystal layer and a driver Integrated Circuit (IC) configured to control signals with respect to the liquid crystal layer.

16. The mobile terminal of claim 15, wherein the driver IC, the light guiding path portion and the key region are stacked in a sequential manner.

17. The mobile terminal of claim 16, wherein at least part of the light guiding path portion is located between the pattern layer and the driver IC.

18. The mobile terminal of claim 14, wherein key marks are formed within the key region, the key marks having different patterns associated with functions of the terminal.

19. The mobile terminal of claim 18, wherein the key region is divided at each of the key marks, and
wherein a light guiding path portion is disposed below each of the divided key regions to guide light toward the corresponding key mark.

* * * * *